United States Patent
Bunselmeier et al.

(10) Patent No.: US 6,364,676 B2
(45) Date of Patent: Apr. 2, 2002

(54) DEVICE FOR TRANSMITTING ENERGY

(75) Inventors: Dirk Bunselmeier; Maik Frenzel, both of Ludenscheid (DE)

(73) Assignee: Leopold Kostal GmbH & Co. KG (DE)

( * ) Notice: Subject to any disclaimer, the term of this patent is extended or adjusted under 35 U.S.C. 154(b) by 0 days.

(21) Appl. No.: 09/885,685

(22) Filed: Jun. 20, 2001

Related U.S. Application Data

(63) Continuation of application No. PCT/EP00/05054, filed on Jun. 2, 2000.

(30) Foreign Application Priority Data

Jun. 9, 1999 (DE) .......................................... 199 26 278

(51) Int. Cl.$^7$ .............................................. H01R 35/04
(52) U.S. Cl. ..................................... 439/164; 439/488
(58) Field of Search ........................... 439/164, 15, 488

(56) References Cited

U.S. PATENT DOCUMENTS

| | | | |
|---|---|---|---|
| 5,256,075 A | * 10/1993 | Miyahara et al. | 439/164 |
| 5,382,172 A | * 1/1995 | Klier et al. | 439/164 |
| 5,611,704 A | * 3/1997 | Kamizono et al. | 439/164 |
| 5,647,753 A | * 7/1997 | Ishikawa et al. | 439/164 |
| 5,655,919 A | 8/1997 | Ishikawa et al. | |
| 5,692,915 A | * 12/1997 | Ishikawa et al. | 439/164 |
| 5,752,844 A | 5/1998 | Kawamoto | |
| 5,762,506 A | * 6/1998 | Du-Rocher | 439/164 |
| 5,766,028 A | * 6/1998 | Ichikawa et al. | 439/164 |
| 5,888,084 A | * 3/1999 | Mukai et al. | 49/164 |
| 5,957,711 A | * 9/1999 | Tanaka et al. | 439/164 |
| 5,971,782 A | * 10/1999 | Masuda | 439/164 |
| 5,980,285 A | * 11/1999 | Matsumoto | 439/164 |
| 6,022,230 A | * 2/2000 | Matsumoto | 439/164 |
| 6,039,588 A | * 3/2000 | Osawa | 439/164 |
| 6,261,112 B1 | * 7/2001 | Mitsui | 439/164 |

FOREIGN PATENT DOCUMENTS

| | | |
|---|---|---|
| DE | 43 29 820 A1 | 3/1994 |
| DE | 44 46 901 A1 | 6/1995 |
| DE | 195 33 439 C1 | 2/1997 |
| EP | 0 860 330 A2 | 8/1998 |

* cited by examiner

Primary Examiner—Gary Paumen

(57) ABSTRACT

The invention relates to a device for transmitting energy which essentially consists of a housing comprising a stator unit and a rotor unit, and of at least one flexible line accommodated inside an annular cavity of the housing. The aim of the invention is to create a device which, with a simple design, reduces, to a minimum, relative movements with contacting application between the housing and the at least one flexible line accommodated in the annular cavity. To this end, the housing consists of a stator bottom part comprising the outer wall and a first bottom wall area, and of a stator top part comprising a first cover wall area. The housing also consists of a rotor bottom part comprising the inner wall and a second bottom wall area, and of a rotor top part comprising a second cover wall area.

20 Claims, 5 Drawing Sheets

DEVICE FOR TRANSMITTING ENERGY

CROSS-REFERENCE TO RELATED APPLICATIONS

This is a continuation of International Application PCT/EP00/05054, with an international filing date of Jun. 2, 2000.

TECHNICAL FIELD

The invention is based on a device for transmitting energy.

BACKGROUND ART

Such devices are provided, e.g., in vehicles to enable reliable transmission of current and/or light between terminal points that can rotate in the steering wheel and terminal points that are stationary in the area of the steering column. By means of the terminal points of such a device, e.g., an airbag system, a steering wheel heater, a shifting mechanism, etc., can be supplied with the voltage and signals necessary for their respective functions.

Such a device is known from DE 195 33 439 C1. In such a device, a plurality of flexible lines are contained within an annular cavity of a housing. One end of each of these flexible lines is fixed to the stator unit and the other end of the flexible line is fixed to a rotatable rotary component of the housing facing the stator unit.

The two broad sides of each of the flexible lines can be wound in at least one turn on the axially oriented inner wall of the housing and by means of a U-shaped reversing section, at a distance and in the opposite direction, there is at least one other turn on the axially oriented outer wall of the housing. Each of the two narrow sides of the flexible lines is held between the radially oriented base and the radially oriented cover of the housing. Such a configuration leads inevitably to relative movements between the flexible lines and the housing when the rotor unit rotates. This is the case, since the turns of the flexible lines associated with both the inner wall and the outer wall partially contact areas of the rotor unit and partially contact areas of the stator unit. In turn, such relative movements between the flexible lines and the housing lead to inevitable, disruptive noise, which for reasons of comfort is often intolerable.

SUMMARY OF THE INVENTION

Accordingly, the objective of the present invention is to disclose a device for transmitting energy, in which, by means of a simple design, the relative movement with touching contact between at least one flexible line in the annular cavity and the housing is reduced to a minimum.

It is advantageous in the case of such a configuration that the turns of the one or more flexible lines associated with the inner wall only contact the rotor unit and the turns of the one or more flexible lines associated with the outer wall only contact the stator unit. Then the device functions without producing disruptive noise.

BRIEF DESCRIPTION OF THE DRAWINGS

Additional advantageous modifications of the object of the invention are described in greater detail with reference to an embodiment illustrated in the appended drawings. Shown are.

DETAILED DESCRIPTION OF THE PREFERRED EMBODIMENT(S)

Figure 1:
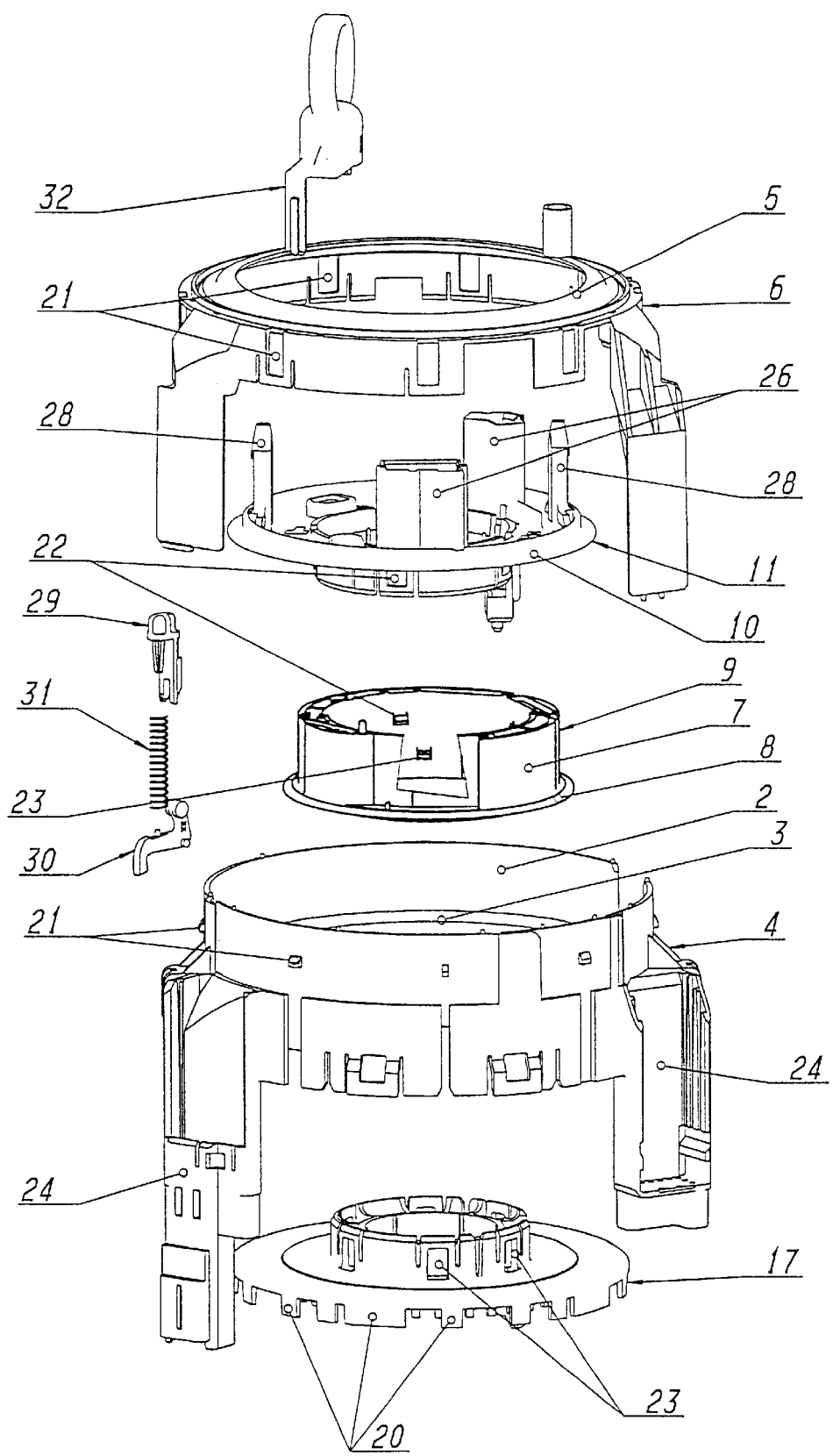
FIG. 1, an exploded view of such a device without flexible lines.

As can be seen in the figures, such a device for transmitting energy essentially consists of a housing with a stator unit and a rotor unit and at least one flexible line (1) inside an annular cavity of the housing.

As can be further seen in the figures, four flexible lines (1) are contained within the annular cavity of the housing. The housing consists of a stator bottom part (4) with the outer wall (2) and a first base section (3), a stator top part (6) with a first cover section (5), a rotor bottom part (9) with the inner wall (7) and a second base section (8), and also a rotor top part (11) with a second cover section (10). The stator bottom part (4) and the stator top part (6) form the stator unit of the housing and the rotor bottom part (9) and the rotor top part (11) form the rotor unit.

Figure 3:
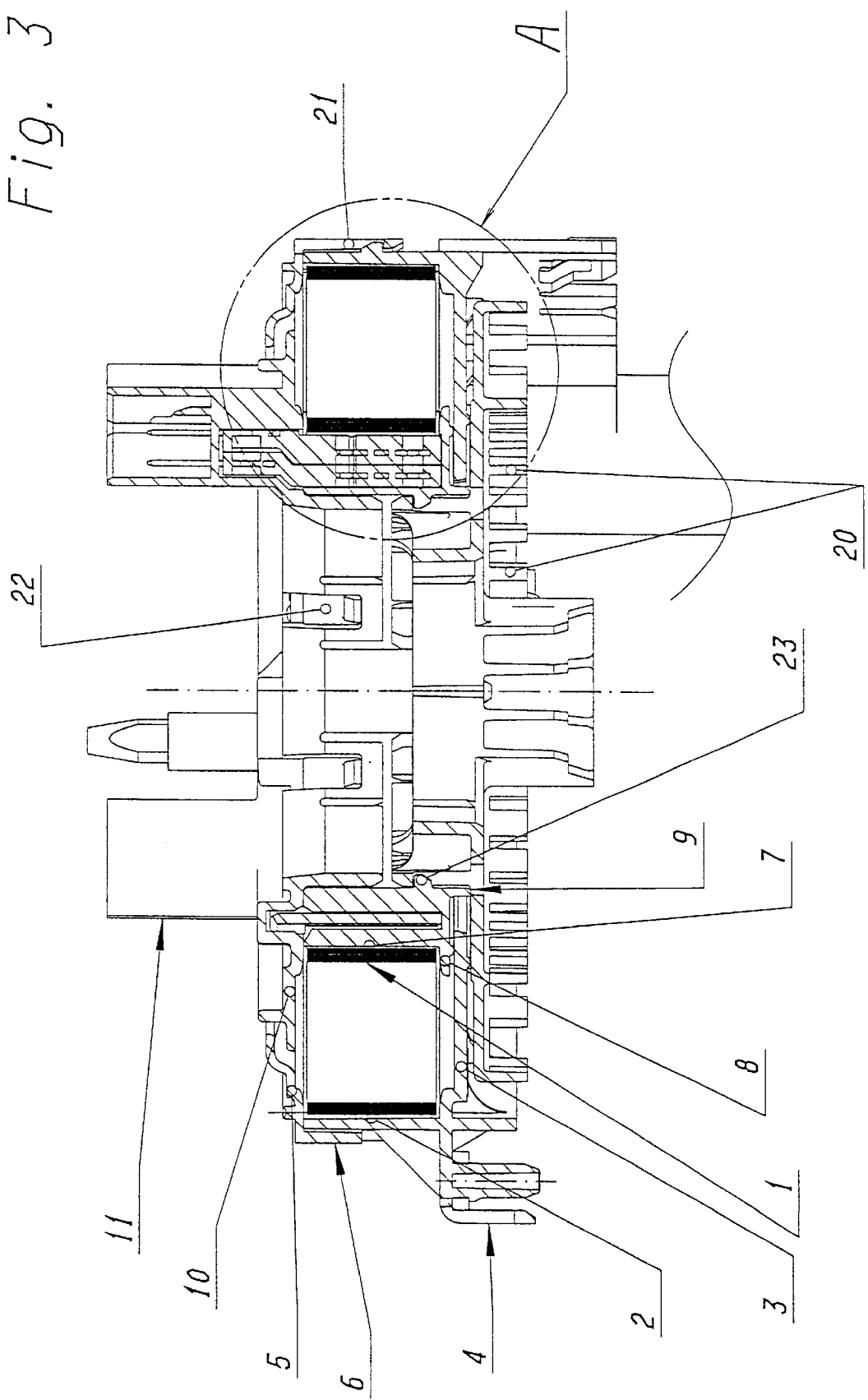
FIG. 3, a full cross section through such a device.
Figure 4:
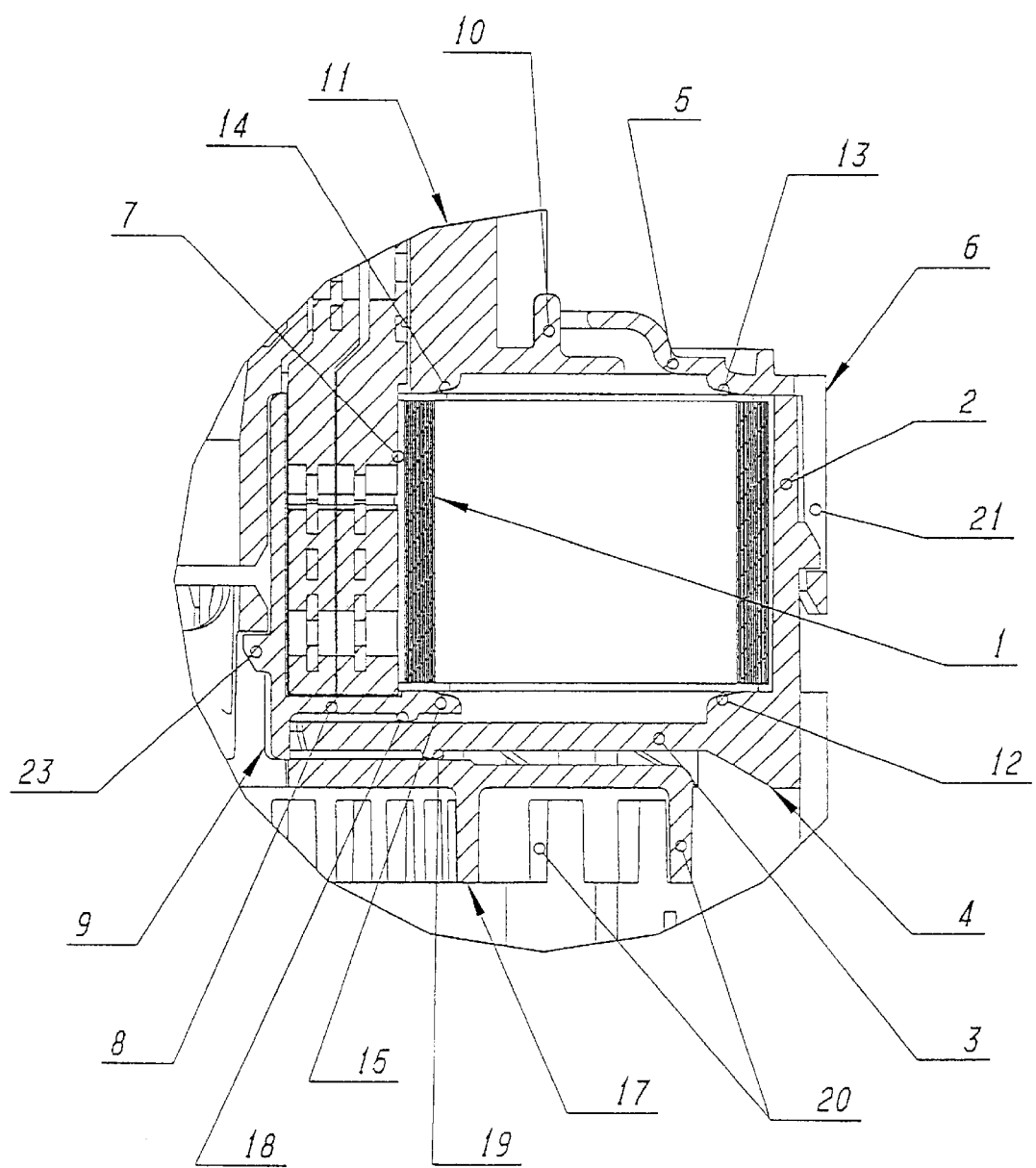
FIG. 4, detail A from FIG. 3, shown enlarged and in section.
Figure 5:
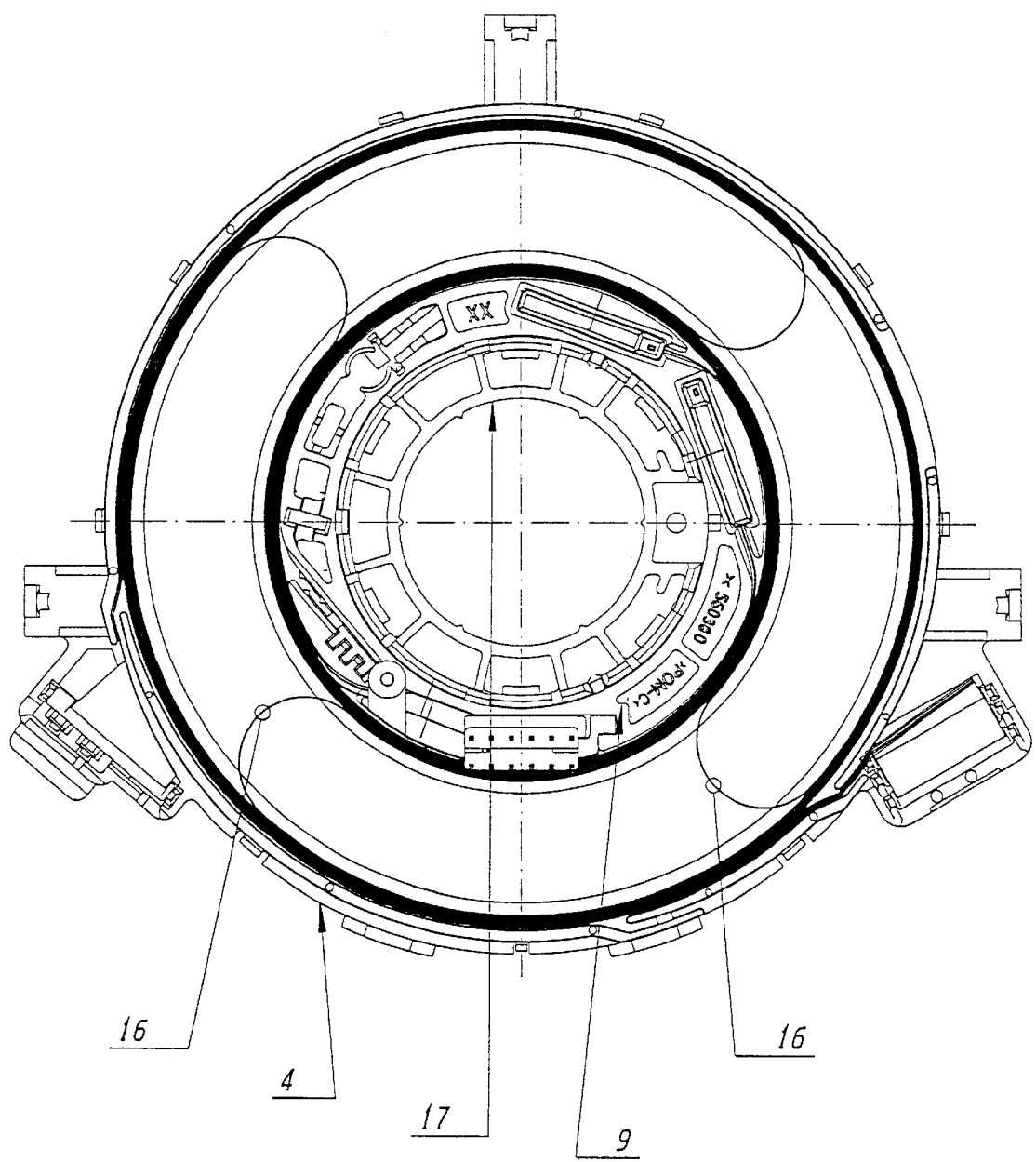
FIG. 5, a top view of the device without the cover.

As clearly shown in FIGS. 3 and 4, an annular first ramp (12) is formed on the base section (3) of the stator bottom part (4). Also formed on the first cover section (5) of the stator top part (6) is an annular second ramp (13), which faces the first ramp (12) at a distance. Furthermore, an annular third ramp (14) is formed integrally with the second cover section (10) of the rotor top part (11) and facing this ramp at a distance is a fourth ramp (15) formed on the second base section (8) of the rotor bottom part (9). The first ramp (12) and the second ramp (13) are associated directly with the outer wall (2) of the housing and the third ramp (14) and the fourth ramp (15) are associated directly with the inner wall (7) of the housing. Because the first ramp (12) and the second ramp (13) restrict the height of the annular cavity of the housing to the width of the four flexible lines (1) with slight play, each of the four flexible lines (1) contacts the first ramp (12) and the second ramp (13) on the stator side, i.e., associated with the outer wall (2).

In the same manner, the narrow side of each of the four flexible lines (1) contacts the third ramp (14) and the fourth ramp (15) on the rotor side, i.e., associated with the inner wall (7) of the housing, since these two ramps (14, 15) also restrict the height of the annular cavity of the housing on the inner side to the width of the four flexible lines (1). Each of the four ramps (12, 13, 14, 15) thus has a narrow, annular guide surface. In order to minimize contact, the free edges of the guide surfaces are each beveled.

Therefore, the turns of the four flexible lines (1) associated with the outer wall (2) only contact the stator unit and the turns of the four flexible lines (1) associated with the inner wall (7) only contact the rotor unit. When the rotor unit rotates, the four flexible lines (1) move relative to the housing only in the area of their U-shaped reversing section (16). Here it is especially advantageous if the transitional sections of the narrow sides of the U-shaped reversing sections (16) only contact the narrow, annular guide surfaces of the four ramps (12, 13, 14, 15). In the entire area of the curved midsections of the U-shaped reversing sections (16) there is no contact between the flexible lines (1) and the housing. Consequently, the development of disruptive noise is effectively suppressed.

As shown especially in FIGS. 1, 3 and 4, the cover of a guide ring (17) is fixed on the rotor bottom part (9) opposite the housing. Thus the first base section (3) of the stator bottom part (4) is held between the underside of the rotor bottom part (9) and the main surface of the guide ring (17) facing the cover. In this way the rotor bottom part (9) is exactly positioned on the stator bottom part (4). So as to realize a defined bearing surface, on one hand, a first bearing bead (18) that contacts the first base section (3) is formed on the bottom surface of the rotor bottom part (9) facing away from the cover. On the other hand, a second bearing bead (19) that contacts the top surface of the guide ring (17) is formed on the surface of the first base section (3) facing away from the cover. Both the first bearing bead (18) and the second bearing bead (19) are designed so as to form a stable fit. Thus a smooth fit is realized, which provides good conditions for preventing disruptive noise, since the unavoidable friction generated in such a union is reduced to a minimum. The underside of the guide ring (17) facing away from the cover has an integrated arrangement of openings (20), which is a functional part of an opto-electronic steering angle sensor not shown in greater detail. In order to realize an especially stable mounting of the rotor unit on the jacket tube of the steering column, which is not shown for the interest of simplicity, a roller bearing, also not shown for the interest of simplicity, can be affixed to the guide ring (17).

In the illustrated embodiment, the rotor unit is positively coupled with the steering wheel for the purpose of rotational synchronization, and for the purpose of secure mounting, the stator unit is fixed on a component that is rigidly joined to the steering column. This fastening can be accomplished by means of interlocking clip elements or alternatively by means of a threaded joint. However, the stator unit can alternatively be secured directly to the jacket tube of the steering column.

As can be further seen especially in FIGS. 1, 3 and 4, the stator top part (6) is joined to the stator bottom part (4) by first clip connections (21). By fastening the clip connections (21), the stator unit is formed. The rotor top part (11) and the rotor bottom part (9) can be assembled together by the second clip connections (22), so that with this engagement, the rotor unit is formed. By means of the third clip connections (23), the guide ring (17) is secured to the rotor bottom part (9). The clip connections (21, 22, 23) consist of several clip tongues which positively engage in comparably designed clip depressions or clip windows.

Figure 2:
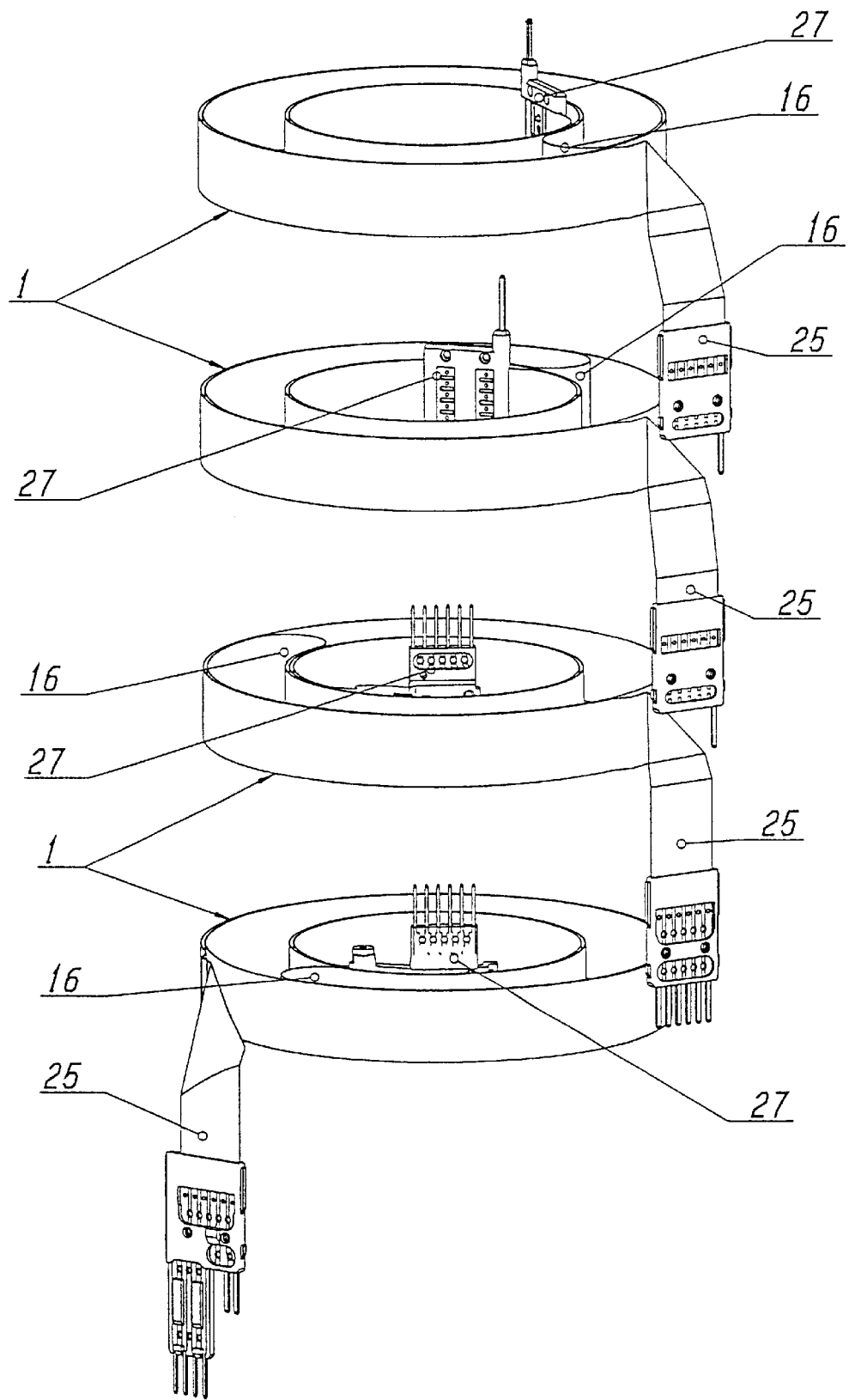
FIG. 2, four flexible lines of such a device in exploded view.

As can be clearly seen in FIGS. 1, 2 and 3, there are two plug-coupling areas (24) on the stator bottom part (4) for connecting the one end (25) of the respective four flexible lines (1). On the rotor top part (11) there are two second plug-coupling areas (26) which are provided for connecting the other ends (27) of the respective four flexible lines (1). Thus a first plug-coupling area (24) and a second plug-coupling area (26) are provided in each case for the connection of two ends (25) or the two other ends (27) of the four flexible lines (1).

As shown in FIG. 1, for engagement or rotational synchronization with the steering column not shown in the interest of simplicity, two synchronization pins (28) are formed on the rotor top part (11). The two synchronization pins (28) engage positively in comparable depressions of the steering wheel when the latter is mounted on the steering spindle. For positional securing of the rotor unit in its defined mounting position (prior to the mounting of the steering wheel), there is a locking rocker (30) actuated by means of a slide (29) that receives force from a threaded pressure spring (31). Only during the installation of the steering wheel is the locking action of the locking rocker (30) automatically released, since a functional element present on the steering wheel acts on the locking rocker (30) via the slide (29). When the steering wheel is dismounted, the locking position of the locking rocker (30) is automatically reestablished due to the threaded pressure spring (31).

In order to ensure the absolutely essential center position until installation of the device, a safety element (32) is provided on the rotor top part (11). The safety element (32) can be removed from the rotor top part (11) only by its mechanical destruction. For this purpose, the safety element (32) has a predetermined breaking point that ensures that a small defined part of the safety element (32) remains on the rotor top part (11). The safety element (32) is affixed in such a way that the aperture necessary for actuating the slide (29) is completely covered, so that the latter or the locking rocker (30) cannot be actuated. As a result, the locking position of the locking rocker (30) is reliably maintained until the safety element (32) has been broken off. When the entire safety element (32) is still present on the rotor top part (11) prior to the mounting of the steering wheel, it can be safely assumed that the device is in the center position and the operating safety of the device is assured. The absence of the safety element (32), on the other hand, is a clear indication that the center position, i.e., the operating safety of the device, is not guaranteed.

What is claimed is:

1. A device for transmitting signals between a steering wheel and a steering column, the device comprising:

a stator fixed to the steering column, the stator having a stator bottom part with an axially oriented outer wall and a first base section, the stator further having a stator top part with a first cover section;

a rotor fixed to the steering wheel to rotate therewith, the rotor having a rotor bottom part with an axially oriented inner wall and a second base section, the rotor further having a rotor top part with a second cover section, wherein the inner and outer walls form an annular cavity having a longitudinal axis; and a conductive flexible line rotatably disposed within the annular cavity around the longitudinal axis of the annular cavity, wherein one end of the flexible line is connected to the stator and the other end of the flexible line is connected to the rotor, wherein the flexible line includes a rotatably disposed winding contacting the inner wall, a rotatably disposed winding contacting the outer wall, and a U-shaped reversing section disposed within the annular cavity connecting the windings;

wherein the first and second cover sections are located within the annular cavity and separated from the first and second base sections so as to restrict the height of the annular cavity to the width of the flexible line such that the winding contacting the inner wall is prevented from contacting the outer wall and the winding contacting the outer wall is prevented from contacting the inner wall when the rotor rotates with the steering wheel.

2. The device of claim 1 wherein:

the first base section of the stator bottom part has an annular first ramp restricting the height of the annular cavity.

3. The device of claim 2 wherein:

the first cover section of the stator top part has an annular second ramp restricting the height of the annular cavity.

4. The device of claim 3 wherein:

the second cover section of the rotor top part has an annular third ramp restricting the height of the annular cavity.

5. The device of claim 4 wherein:

the second base section of the rotor bottom part has an annular fourth ramp restricting the height of the annular cavity.

6. The device of claim 3 wherein:

the winding contacting the outer wall contacts the annular first ramp of the first base section of the stator bottom part and the annular second ramp of the first cover section of the stator top part.

7. The device of claim 5 wherein:

the winding contacting the inner wall contacts the annular third ramp of the second cover section of the rotor top part and the annular fourth ramp of the second base section of the rotor bottom part.

8. The device of claim 1 further comprising:

a guide ring fixed on the rotor bottom part and opposite the first and second cover sections such that the first base section of the stator bottom part is retained between the rotor bottom part and the guide ring.

9. The device of claim 1 wherein:

the rotor bottom part includes an annular first bearing bead resting on the first base section of the stator bottom part.

10. The device of claim 8 wherein:

the first base section of the stator bottom part includes an annular second bearing bead resting on the guide ring.

11. The device of claim 8 wherein:

the guide ring includes a code device for a steering angle sensor.

12. The device of claim 11 wherein:

the code device includes a plurality of openings for a steering angle sensor.

13. The device of claim 8 wherein:

the guide ring holds a roller bearing.

14. The device of claim 1 further comprising:

interlocking first clip connections for joining the stator top part and the stator bottom part.

15. The device of claim 1 further comprising:

interlocking second clip connections for joining the rotor top part and the rotor bottom part.

16. The device of claim 8 further comprising:

interlocking third clip connections for joining the guide ring to the rotor bottom part.

17. The device of claim 1 wherein:

the stator bottom part further includes a first plug-coupling area for receiving the one end of the flexible line connected to the stator.

18. The device of claim 1 wherein:

the rotor top part further includes a second plug-coupling area for receiving the other end of the flexible line connected to the rotor.

19. A device for transmitting signals between a steering wheel and a steering column, the device comprising:

a stator fixed to the steering column, the stator having a stator bottom part with an axially oriented outer wall and a first base section, the stator further having a stator top part with a first cover section;

a rotor fixed to the steering wheel to rotate therewith, the rotor having a rotor bottom part with an axially oriented inner wall and a second base section, the rotor further having a rotor top part with a second cover section, wherein the inner and outer walls form an annular cavity having a longitudinal axis; and at least one conductive flexible line rotatably disposed within the annular cavity around the longitudinal axis of the annular cavity, wherein one end of the at least one flexible line is connected to the stator and the other end of the at least one flexible line is connected to the rotor, wherein the at least one flexible line includes rotatably disposed windings contacting the inner wall, rotatably disposed windings contacting the outer wall, and a U-shaped reversing section disposed within the annular cavity connecting the windings;

wherein the first and second cover sections are located within the annular cavity and separated from the first and second base sections so as to restrict the height of the annular cavity to the width of the at least one flexible line such that the winding contacting the inner wall is prevented from contacting the outer wall and the winding contacting the outer wall is prevented from contacting the inner wall when the rotor rotates with the steering wheel.

20. A device for transmitting signals between a steering wheel and a steering column, the device comprising:

a stator fixed to the steering column, the stator having a stator bottom part with an axially oriented outer wall and a first base section, the stator further having a stator top part with a first cover section;

a rotor fixed to the steering wheel to rotate therewith, the rotor having a rotor bottom part with an axially oriented inner wall and a second base section, the rotor further having a rotor top part with a second cover section, wherein the inner and outer walls form an annular cavity having a longitudinal axis; and a conductive flexible line rotatably disposed within the annular cavity around the longitudinal axis of the annular cavity, wherein one end of the flexible line is connected to the stator and the other end of the flexible line is connected to the rotor, wherein the flexible line includes a rotatably disposed first winding contacting the inner wall, a rotatably disposed second winding contacting the outer wall, and a U-shaped reversing section disposed within the annular cavity connecting the first and second windings;

wherein the first and second cover sections are located within the annular cavity and separated from the first and second base sections so as to restrict the height of the annular cavity to the width of the flexible line, wherein the first cover section and the first base station each contact the second winding to prevent the second winding from contacting the outer wall when the rotor rotates with the steering wheel, wherein the second cover section and the second base section contact the first winding to prevent the first winding from contacting the inner wall when the rotor rotates with the steering wheel.

* * * * *